(12) United States Patent
Wu et al.

(10) Patent No.: US 7,474,471 B2
(45) Date of Patent: Jan. 6, 2009

(54) OPTICAL UNIT, IMAGE CAPTURING DEVICE, AND REFLECTIVE DEVICE

(75) Inventors: Yi-Lung Wu, Taipei Hsien (TW); Yao-Shih Leng, Taipei Hsien (TW); Pi-Chang Jung, Taipei Hsien (TW)

(73) Assignee: Micro-Star International Co., Ltd., Taipei (TW)

( * ) Notice: Subject to any disclaimer, the term of this patent is extended or adjusted under 35 U.S.C. 154(b) by 85 days.

(21) Appl. No.: 11/650,077

(22) Filed: Jan. 4, 2007

(65) Prior Publication Data

US 2007/0165983 A1    Jul. 19, 2007

(30) Foreign Application Priority Data

Jan. 18, 2006    (TW) .............................. 95101878 A

(51) Int. Cl.
*G02B 3/12*    (2006.01)
*G02B 1/06*    (2006.01)
*G02B 7/182*    (2006.01)

(52) U.S. Cl. ...................... 359/665; 359/667; 359/846; 359/878

(58) Field of Classification Search ......... 359/665–667, 359/846, 847, 878
See application file for complete search history.

(56) References Cited

U.S. PATENT DOCUMENTS

| 4,783,155 | A | * | 11/1988 | Imataki et al. | ............... 359/666 |
| 5,889,256 | A | | 3/1999 | Osanai | |
| 5,917,657 | A | | 6/1999 | Kaneko et al. | |
| 6,542,309 | B2 | * | 4/2003 | Guy | ........................... 359/666 |

FOREIGN PATENT DOCUMENTS

CN           1137430 A    12/1996

* cited by examiner

*Primary Examiner*—Darryl J Collins
(74) *Attorney, Agent, or Firm*—Ladas & Parry LLP

(57) ABSTRACT

An optical unit includes a closed hollow body defining an enclosed chamber therein, and having an optical part that confines a portion of the chamber and that is deformable so as to be changeable in thickness and shape in response to changes in an inner pressure in the chamber. An image capturing device includes: a light-proof image-capturing housing that has a lens-mounting port; an image processing unit mounted in the image-capturing housing; and a focus-adjustable lens unit coupled to the lens-mounting port and including a closed hollow body defining an enclosed chamber therein, and having an optical part that confines a portion of the chamber, that is aligned with the lens-mounting port along an optical path, and that is deformable so as to be changeable in thickness and shape in response to changes in an inner pressure in the chamber. A reflective device is also disclosed.

1 Claim, 4 Drawing Sheets

OPTICAL UNIT, IMAGE CAPTURING DEVICE, AND REFLECTIVE DEVICE

CROSS-REFERENCE TO RELATED APPLICATION

This application claims priority of Taiwanese application no. 095101878, filed on Jan. 18, 2006.

BACKGROUND OF THE INVENTION

1. Field of the Invention

This invention relates to an optical unit, an image capturing device and a reflective device.

2. Description of the Related Art

As shown in FIG. 1, a conventional imaging module 10 has a housing 100, a lens 101, and a reflecting mirror (not shown) associated with the lens 101. The conventional imaging module 10 is disadvantageous in that adjustment of the focus and the viewing angle requires disassembly of the housing 100, the lens 101, and the reflecting mirror, which is relatively inconvenient.

In addition, a viewing mirror of an automobile is usually a flat mirror, or a flat mirror provided with a small convex mirror thereon. Since the convex mirror has a small area and a fixed curvature, the practical use is limited.

Therefore, there is a need in the art to provide an optical unit that can overcome the aforesaid drawbacks of the prior art.

SUMMARY OF THE INVENTION

According to one aspect of the present invention, an optical unit includes a closed hollow body defining an enclosed chamber therein, and having an optical part that confines a portion of the chamber and that is deformable so as to be changeable in thickness and shape in response to changes in an inner pressure in the enclosed chamber.

According to another aspect of the present invention, an image capturing device includes: a light-proof image-capturing housing that has a lens-mounting port; an image processing unit mounted in the image-capturing housing; and a focus-adjustable lens unit coupled to the lens-mounting port of the image-capturing housing and including a closed hollow body defining an enclosed chamber therein, and having an optical part that confines a portion of the chamber, that is aligned with the lens-mounting port along an optical path, and that is deformable so as to be changeable in thickness and shape in response to changes in an inner pressure in the enclosed chamber.

According to yet aspect of the present invention, a reflective device includes a closed hollow body defining an enclosed chamber therein, and having an optical part that confines a portion of the chamber and that is deformable so as to be changeable in thickness and shape in response to changes in an inner pressure in the enclosed chamber, the optical part having a resilient web that is changeable in shape and thickness in response to changes in the inner pressure of the enclosed chamber, and a light reflecting layer that is formed on the resilient web and that is co-changeable in shape with the resilient web in response to changes in the inner pressure of the enclosed chamber.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
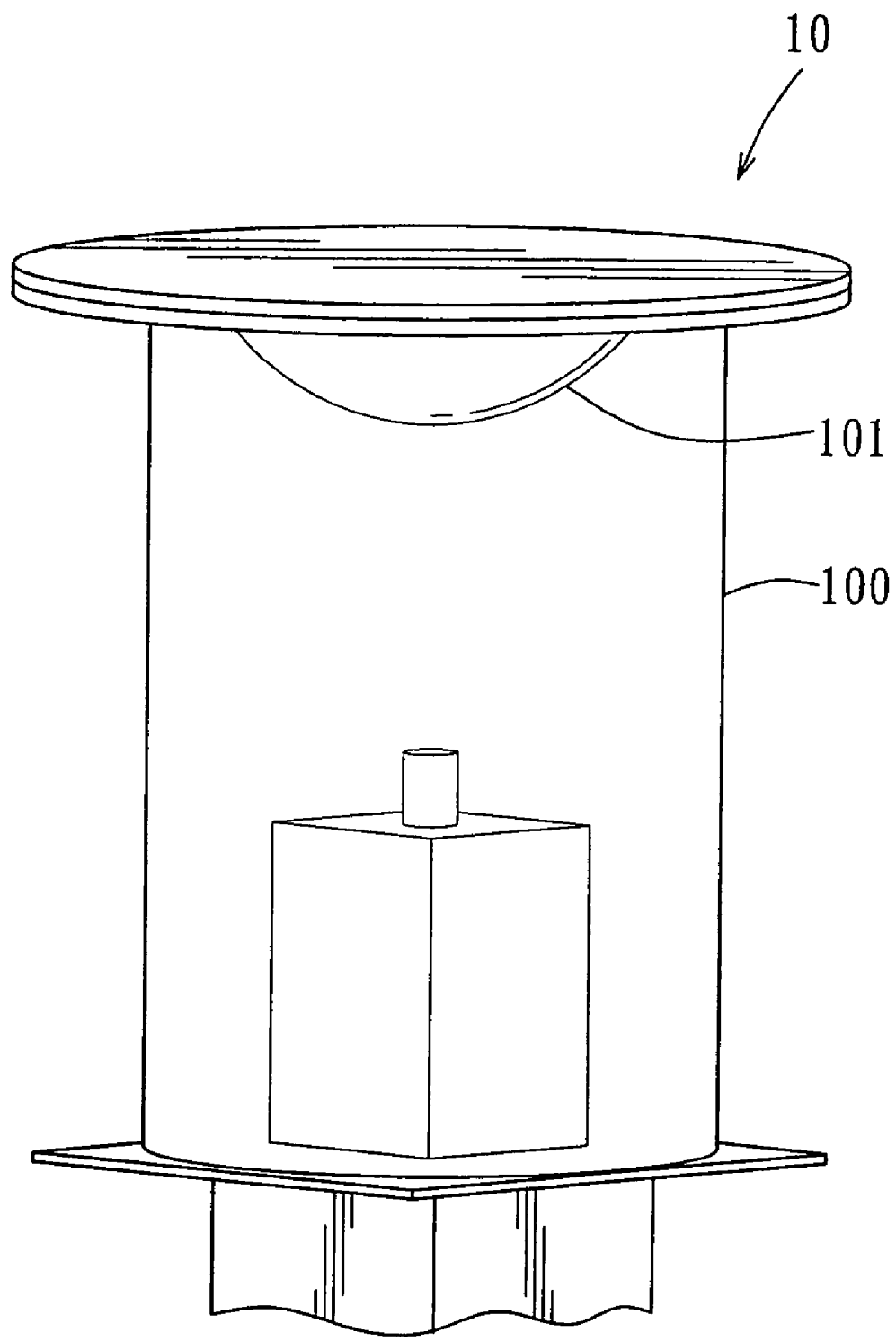
FIG. 1 is a fragmentary perspective view of a conventional imaging module.
Figure 2:
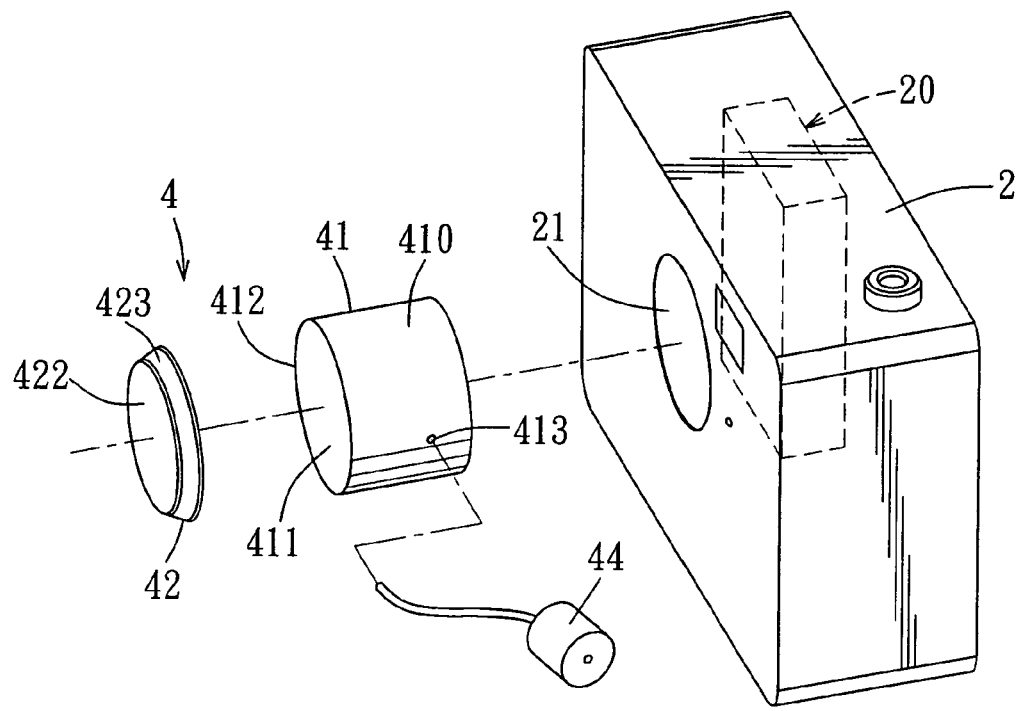
FIG. 2 is a partly exploded perspective view of the preferred embodiment of an image capturing device according to this invention.
Figure 4:
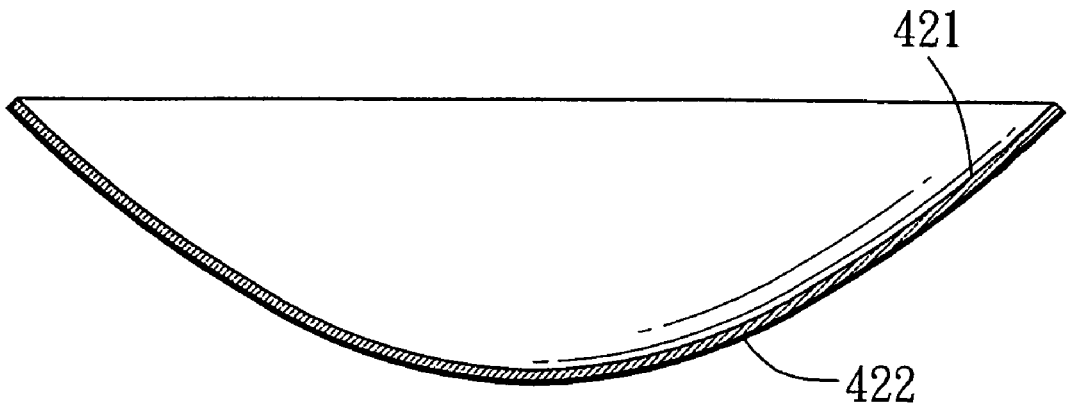
FIG. 4 is a sectional view of an optical part of the preferred embodiment according to this invention in an expanded state.
Figure 5:
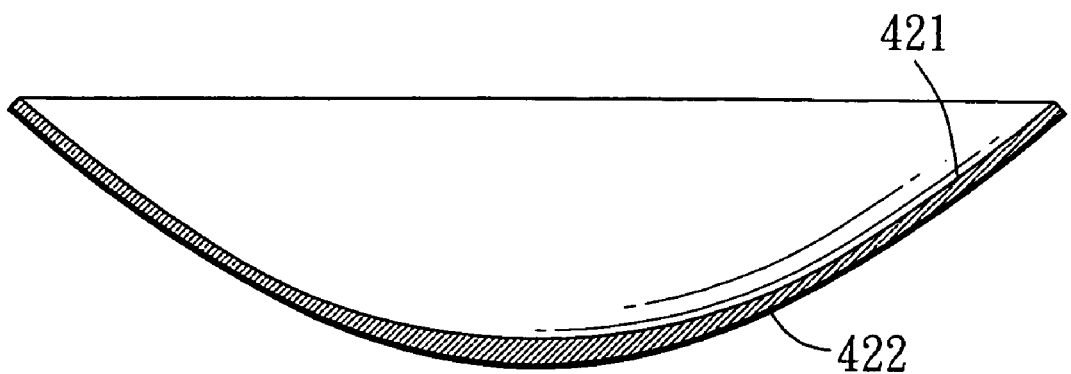
FIG. 5 is a sectional view of the optical part of the preferred embodiment in a non-expanded state.

The preferred embodiment of an optical unit 4 according to the present invention will be described with reference to FIGS. 2, 4, and 5. As shown in FIG. 2, the optical unit 4 of this invention includes a closed hollow body 41 defining an enclosed chamber 411 therein, and having an optical part 42 that confines a portion of the enclosed chamber 411 and that is deformable so as to be changeable in thickness and shape in response to changes in an inner pressure in the enclosed chamber 411. As shown in FIG. 4, the optical part 42 has a resilient web 421 that is changeable in shape and thickness in response to changes in the inner pressure of the enclosed chamber 411, and a light directing layer 422 that is formed on the resilient web 421 and that is co-changeable in shape with the resilient web 421 in response to changes in the inner pressure of the enclosed chamber 411.

Preferably, the closed hollow body 41 further has a rigid mounting part 410 that has an open end 412, and a resilient connecting part 423 that is connected sealingly to and that extends from a periphery of the open end 412 of the rigid mounting part 410. The resilient connecting part 423 extends from a periphery of the resilient web 421 of the optical part 42, and is tapered from the resilient web 421 to the rigid mounting part 410. Moreover, the resilient connecting part 423 is integrally formed with the resilient web 421, and cooperates with the resilient web 421 and the rigid mounting part 410 to define the enclosed chamber 411 thereamong.

Preferably, the rigid mounting part 410 has an air inlet 413. The optical unit 4 further includes a pressure controlling unit 44 connected to the rigid mounting part 410 and in fluid communication with the enclosed chamber 411 through the air inlet 413 for adjusting the inner pressure in the enclosed chamber 411 so as to change the shape and the thickness of the optical part 42.

In this invention, the resilient web 421 is made from a material selected from the group consisting of: natural rubber, styrene-butadiene rubber, butadiene acrylonitrile rubber, ethylene-propylene-diene rubber, isobutylene-isoprene rubber, neoprene rubber, polyurethane rubber, and silicon rubber.

The light directing layer 422 can be a reflective layer so as to form the optical part 42 into a reflector, or a transparent refractive layer so as to form the optical part 42 into a lens. Preferably, the light directing layer 422 is formed on the resilient web 421 using a coating method, sputtering method, anode treatment, and/or vapor deposition. The light directing layer 422 is made from silver or chrome when the optical part 42 serves as a reflector.

It should be noted that the relationship between the pressure change in the enclosed chamber 411 and the change in the shape and thickness of the optical part 42 should be calculated in advance so as to achieve the best curvature of the optical part 42. In addition, the coated density of the light directing layer 422 should be considered so as to accomplish proper reflective/refractive effects at different curvatures of the optical part 42. FIGS. 4 and 5 show the thickness difference before and after pressure change in the enclosed chamber 411, respectively.

Figure 3:
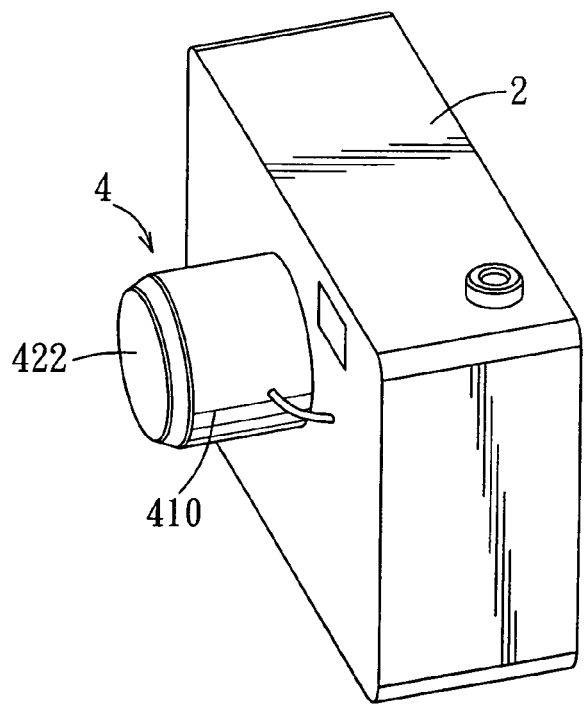
FIG. 3 is an assembled perspective view of the preferred embodiment of the image capturing device shown in FIG. 2.

The optical unit 4 of this invention can be used in an image capturing device with the optical part 42 serving as a focus-adjustable lens. FIGS. 2 and 3 show the preferred embodiment of an image capturing device according to this invention. The image capturing device includes a light-proof image-capturing housing 2 that has a lens-mounting port; an image processing unit 20 mounted in the image-capturing housing 2; and a focus-adjustable lens unit 4 coupled to the lens-mounting port 21 of the image-capturing housing 2.

As described above, the structure of the focus-adjustable lens unit 4 is the same as that of the optical unit 4 except that the light directing layer 422 of the optical part 42 should be a light refractive layer so as to form the optical part 42 into a lens. In addition, the enclosed chamber 411 defined by the closed hollow body 410 and the optical part 42 are aligned with the lens-mounting port 21 along an optical path so as to direct light toward the image processing unit 20.

Figure 6:
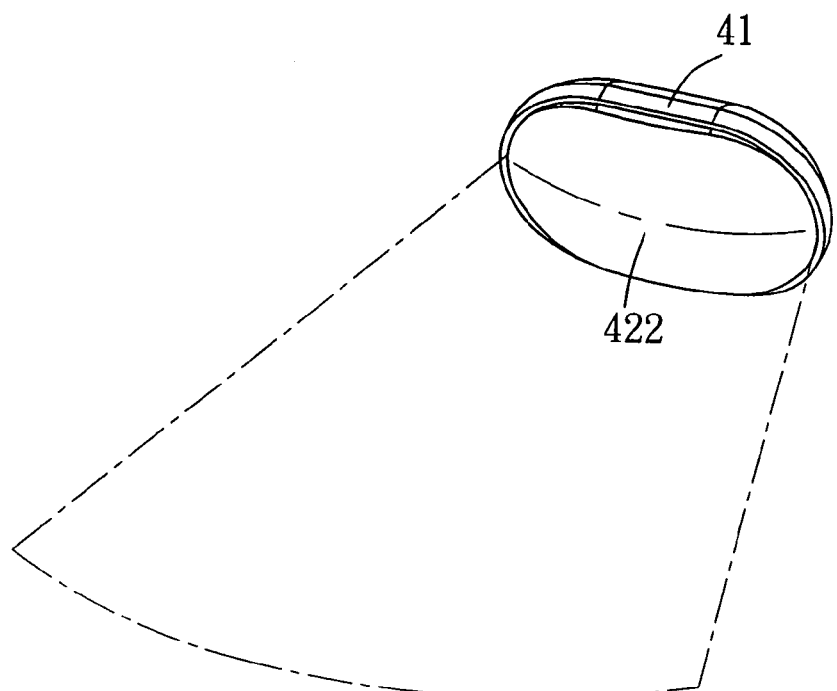
FIG. 6 is a perspective view of the preferred embodiment of a reflective device according to this invention in a state of a narrow viewing angle.
Figure 7:
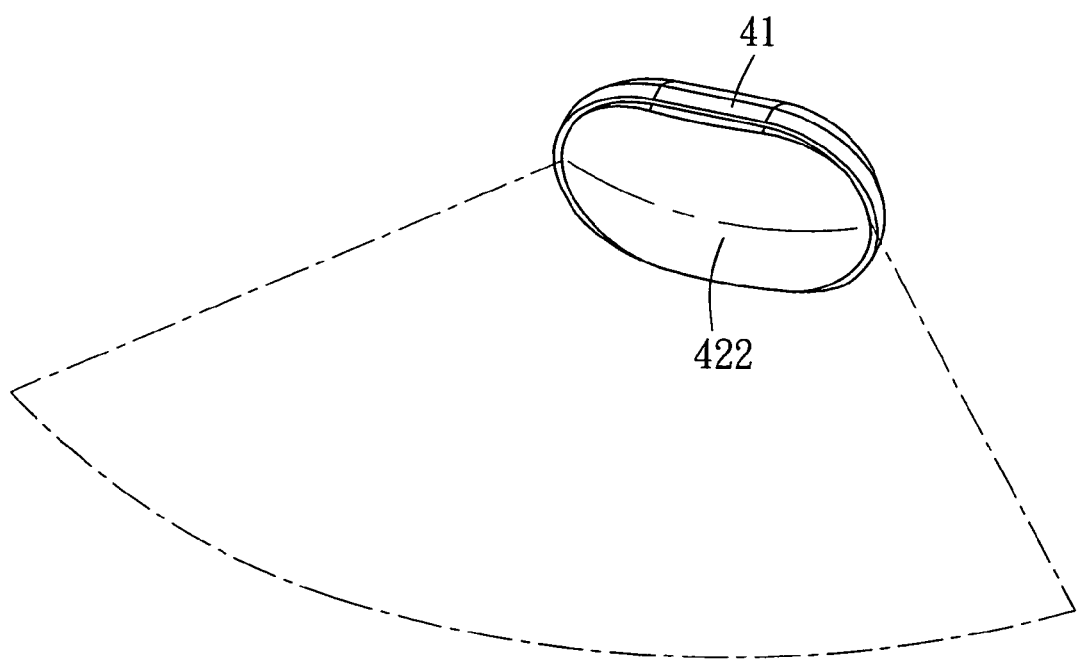
FIG. 7 is a perspective view of the preferred embodiment of the reflective device according to this invention in a state of a wide viewing angle.

The optical unit 4 of this invention can also be used as a reflective device, e.g., a viewing mirror of an automobile, as best illustrated in FIGS. 6 and 7. In this embodiment, the light directing layer 421 is a light reflecting layer. As described above, by adjusting the pressure in the enclosed chamber 411, the thickness and the shape of the optical part 42 (e.g., curvature of the viewing mirror) can be changed so as to change the viewing angle of the viewing mirror (see FIGS. 6 and 7).

According to the present invention, with the thickness and shape changeable optical part 42, the focus and the viewing angle of the optical unit 4 can be easily adjusted. Moreover, by applying the optical unit 4 in the image capturing device (e.g., a camera), an actuator for adjusting the focus of a lens in the image capturing device can be eliminated. In addition, the viewing angle of a viewing mirror of an automobile can be changed by using the optical unit 4.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. An optical unit comprising:
   a closed hollow body defining an enclosed chamber therein, and having an optical part that confines a portion of said chamber and that is deformable so as to be changeable in thickness and shape in response to changes in an inner pressure in said enclosed chamber, said optical part having a resilient web that is changeable in shape and thickness in response to changes in the inner pressure of said enclosed chamber, and a light directing layer that is formed on said resilient web and that is co-changeable in shape with said resilient web in response to changes in the inner pressure of said enclosed chamber,
   wherein said closed hollow body further has a rigid mounting part that has an open end, and a resilient connecting part that is connected sealingly to and that extends from a periphery of said open end of said rigid mounting part, said resilient connecting part extending from a periphery of said resilient web of said optical part, being integrally formed with said resilient web, and cooperating with said resilient web and said mounting part to define said enclosed chamber thereamong, and
   wherein said resilient connecting part is tapered from said resilient web to said mounting part.

* * * * *